United States Patent [19]

Kato

[11] Patent Number: 4,636,347
[45] Date of Patent: Jan. 13, 1987

[54] METHOD OF MAKING A FASTENER

[75] Inventor: Masami Kato, Nagoya, Japan

[73] Assignee: Toska Co., Ltd., Tokyo, Japan

[21] Appl. No.: 617,463

[22] Filed: Jun. 5, 1984

[30] Foreign Application Priority Data

Jun. 15, 1983 [JP] Japan ................. 58-105733

[51] Int. Cl.[4] ............................................ B29C 45/14
[52] U.S. Cl. ................... 264/251; 264/154; 264/157; 264/260; 264/334
[58] Field of Search ............ 264/251, 259, 260, 334, 264/157, 154, 297.2

[56] References Cited

U.S. PATENT DOCUMENTS

| 2,920,354 | 1/1960 | Zumbrunnen | 264/251 |
| 4,143,113 | 3/1979 | Suzuki | 264/334 |
| 4,389,365 | 6/1983 | Kudriavetz | 264/334 |

FOREIGN PATENT DOCUMENTS

51-98763 8/1976 Japan ................. 264/251

Primary Examiner—Donald Czaja
Assistant Examiner—Mary Lynn Fertig
Attorney, Agent, or Firm—Browdy and Neimark

[57] ABSTRACT

A fastener comprising a female member having an opening, a male member which is engageable in the opening of the female member and a string member joining the female and male members, and a fastener assembly comprising a plurality of such fasteners joined together. The female and male members are molded from a thermoplastic synthetic resin, and fused to the string member. The fastener or fastener assembly is made by a method comprising placing a string through a female member forming mold and a male member forming mold, supplying a molten thermoplastic resin into the molds to form a female member and a male member, removing the molded female and male members from the molds, moving the string forward, repeating the molding of a plurality of female and male members, and if appropriate, cutting the string between the female member of one fastener and the male member of another.

54 Claims, 20 Drawing Figures

PRIOR ART

PRIOR ART

PRIOR ART

METHOD OF MAKING A FASTENER

BACKGROUND

1. Field of the Invention

This invention relates to a fastener for attaching a trade or price tag to an article, or binding or joining a plurality of articles, and a method of making such a fastener. More particularly, it relates to a self-lockable fastener having a very long stringy member of any material and a method of making the same continuously.

2. Description of the Prior Art

Figure 1:
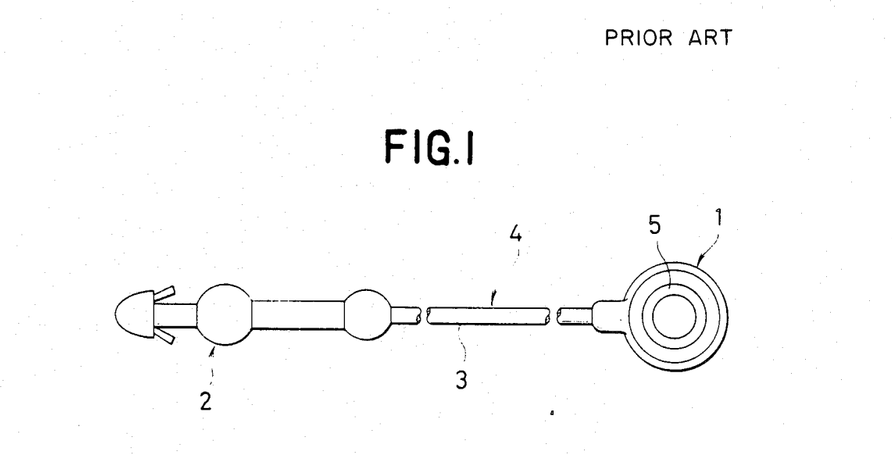
FIG. 1 is a fragmentary top plan view of a fastener known in the art.
Figure 2:
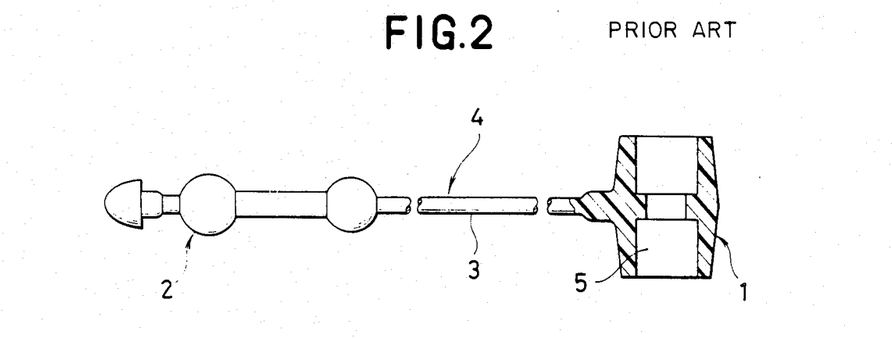
FIG. 2 is a side elevational view, partly in section, of the fastener shown in FIG. 1.
Figure 3:
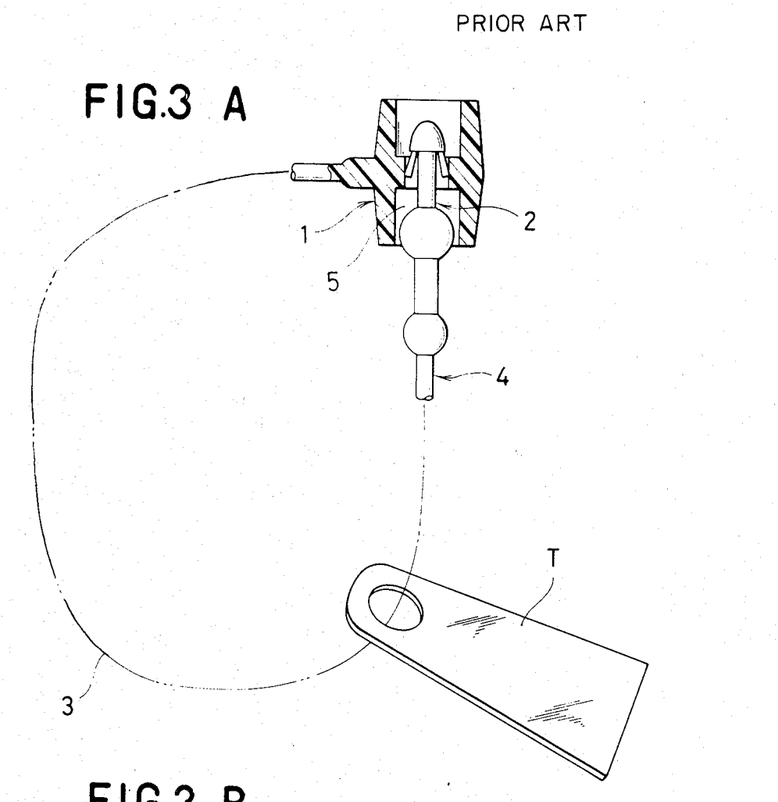
FIGS. 3A and 3B illustrate the use of the fastener shown in FIGS. 1 and 2.

There is known a fastener which is generally shown at 4 in FIGS. 1 and 2 and comprises a socket 1 having an opening 5, a head 2 which is engageable in the socket 1, and a filament 3 connecting the socket 1 and the head 2. This fastener is a unitary product molded from a thermoplastic synthetic resin. The head 2 is locked in the opening 5 of the socket 1 as shown in FIGS. 3A and 3B, whereby a tag or label T showing the price or quality of an article is attached thereto. The fastener is also used for binding or holding together two or more objects, such as members for sealing the cover of an instrument, slippers or sandals, or for closing the mouth of a bag.

The fastener has hitherto been made by a method which comprises injecting a thermoplastic synthetic resin into a mold to form a blank having an unstretched filament, and stretching the filament. This method, however, enables the filament to be stretched by only two or three times to a length not more than, say, 20 to 30 cm. This filament length does not permit the use of the fastener for any bulky article, such as a down jacket or overcoat.

Attempts have been made to manufacture a fastener having a very long filament, but have not turned out to be successful. The use of a long and slender mold has been proposed for making a fastener having a long filament. The molten resin does, however, not flow smoothly in the mold, because of the resistance which it receives from the mold, and also because the resin solidifies on the inner wall of the mold and reduces the inside diameter of the mold. It has only been possible to make a blank having a limited filament length.

SUMMARY

It is a first object of this invention to provide a fastener having a very long filament, as having a length of 50 cm or 1 m, and a method of making such a fastener.

It is a second object of this invention to provide a fastener having a filament formed from not only a synthetic resin, but also natural fiber or a metal, and a method of making such a fastener.

It is a third object of this invention to provide a fastener having a filament which does not require stretching, and a method of making such a fastener continuously.

It is a fourth object of this invention to provide a fastener assembly composed of a fastener having a head joined by a string to the socket of another fastener, and a method of making such a fastener assembly.

These objects are attained by a fastener comprising a female member having an opening, a male member which is engageable in the opening of the female member and a string member joining the female and male members, the female and male members being molded from a thermoplastic synthetic resin, the string member being inserted in the female and male members, the female and male members being fused to the string member.

The fastener is made by a method comprising extending a string through a mold, supplying the mold with a molten thermoplastic synthetic resin to form a female member and a male member, removing said female and male members from the mold, moving the string, molding another female member and another male member, and cutting the string between the female member of one fastener and the male member of another fastener.

THE PREFERRED EMBODIMENTS

Figure 4:
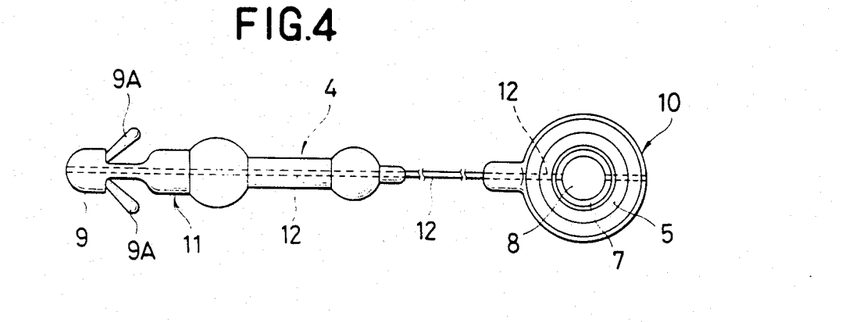
FIG. 4 is a fragmentary top plan view of a fastener according to a first embodiment of this invention.
Figure 5:
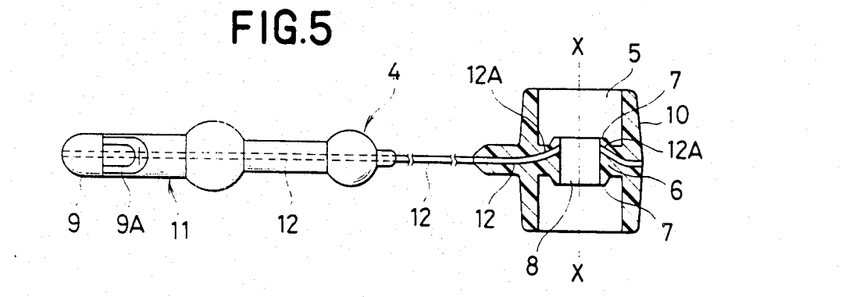
FIG. 5 is a side elevational view, partly in section, of the fastener shown in FIG. 4.

A fastener according to a first embodiment of this invention is generally shown at 4 in FIGS. 4 and 5, and comprises a female member 10, a male member 11 which is engageable with the female member 10, and a string member 12 joining the female and male members 10 and 11. The female member 10 has an opening 5 in which the male member 11 is engageable. The female and male members 10 and 11 are molded from a thermoplastic synthetic resin. The female member 10 is generally cylindrical, and is provided within its opening 5 with an inner flange 6 having a pair of faces lying at right angles to the longitudinal axis X—X thereof. The inner flange 6 has an annular wall 7 surrounding an axial bore 8. The male member 11 includes a head 9 and a pair of tongs 9A attached to the rear end of the head 9. The axial bore 8 has a diameter which is greater than the outside diameter of the head 9.

The string member 12 in the female member 10 lies in a central plane which is perpendicular to the longitudinal axis X—X thereof. The string member 12 is fused to the female member 10 formed from a thermoplastic synthetic resin. The string member 12 has a portion removed from the axial bore 8 during the process of manufacture as will hereinafter be described. The string member 12 is curved upwardly adjacent to the axial bore 8 as shown at 12A, as a result of the removal of the string portion extending diametrically of the axial bore 8.

The string member 12 extends axially through the male member 11, and the male member 11 is fused to the string member 12. The male member 11 can be locked in the female member 10. If the male member 11 is inserted in the opening 5 of the female member 10 and its axial bore 8, the tongs 9A are closed, but upon passage of the head 9 through the axial bore 8, the tongs 9A return to their open position, whereby the male member 11 is locked in the female member 10, as shown in FIG. 3A.

The female and male members 10 and 11 may be formed from the same or different thermoplastic synthetic resins, such as a polyester or polyamide resin.

The string member 12 may be formed from a variety of materials which are applicable to the filament 3 in the conventional fastener 4 shown in FIGS. 1 and 2. It may, for example, be a stretched monofilament of a thermoplastic resin such as polyester or polyamide, a string of natural fiber such as hemp, cotton, wool or silk fiber, a string of inorganic material such as glass fiber, asbestos, iron or steel, or a string of natural resin such as rubber or heat resistant rubber. When the string member 12 comprises a stretched monofilament of a thermoplastic resin or a string as recited above, it must have a melting point which is higher than that of the resin forming the female and male members 10 and 11.

According to this invention, the female and male members 10 and 11 may be constructed in a variety of shapes without being limited to those shown in FIGS. 1 to 5, if the male member is engageable in the female member.

Figure 6:
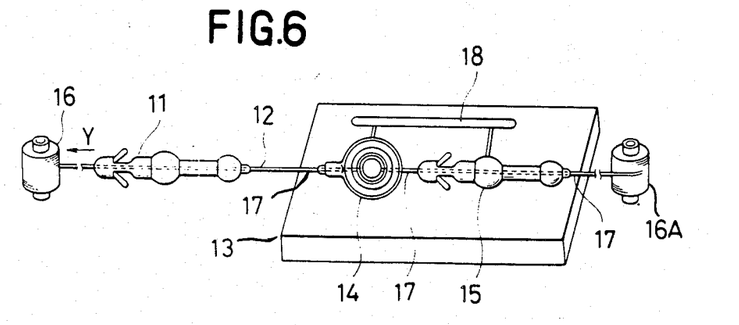
FIG. 6 is a schematic view showing a mold in which a female member and a male member are formed for making the fastener according to the method of this invention.

A method of making the fastener of FIGS. 4 and 5 will be described by way of example with reference to FIG. 6. FIG. 6 shows a mold of which the upper half has been removed. The lower half 13 of the mold has a lower cavity 14 for molding a female member 10, a lower cavity 15 for molding a male member 11 and a number of string guide passages 17. A string 12 extending between a pair of reels 16 and 16A is placed in the cavities 14 and 15 and the guide passages 17. The upper half of the mold not shown, but of the same construction with the lower half 13 is placed in intimate contact with the lower half 13. A molten thermoplastic resin is injected through a sprue 18 into the cavities defined between the upper and lower halves of the mold to form a female member 10 and a male member 11. After they have been removed from the mold, the string 12 is moved in the direction of an arrow Y so that the string 12 carrying the female and male members 10 and 11 may be wound on the reel 16. The mold is now ready for making another female member and another male member.

The distance of movement of the string 12 in the direction of the arrow Y depends on the length of the string member 12 desired in the fastener of this invention. The repetition of the procedures hereinabove described provides a fastener assembly comprising a plurality of fasteners joined together by the string 12. If an assembly carrying a desired number of fasteners has been molded, it is unwound from the reel, and the string 12 is cut between the female member 10 of one fastener and the male member 11 of another, whereby a plurality of individual fasteners are obtained.

Figure 7:
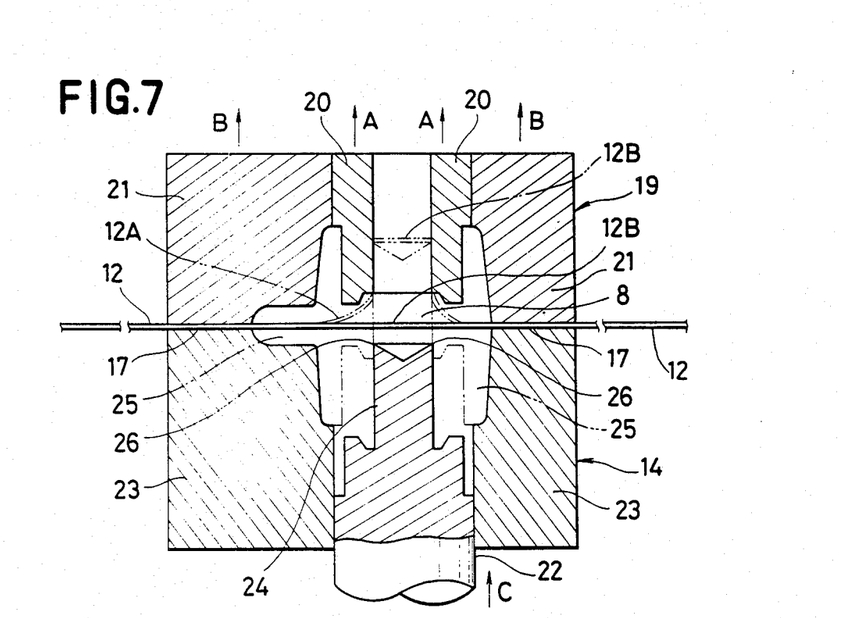
FIGS. 7 and 8 are cross sectional views showing the construction of a mold for forming the female member in the fastener of FIG. 4 and the mode of its molding operation.

The construction of the mold and the method of this invention will now be described in further detail. FIG. 7 shows the string 12 extending through the cavity 25 defined between the lower mold 14 (FIG. 6) for the female member 10 and an upper mold 19. The upper mold 19 includes a first member 20 and a second member 21. The lower mold 14 includes a first member 22 and a second member 23. The first member 22 of the lower mold 14 is initially in its lowered position so as to allow the passage of the string 12. The string 12 is placed in the guide passages 17 on the second member 23 of the lower mold, and the upper mold 19 is placed on the second member 23. The first member 22 of the lower mold is raised in the direction of an arrow C to a position shown by two-dot chain lines in FIG. 7. The first member 22 has an upright projection 24 provided at its upper end with a pair of string cutting edges 26. When the first member 22 is raised, the cutting edges 26 cut away a string portion 12B from the axial bore 8, and the cavity 25 for molding a female member 10 is established. The string 12 is flexible, and when the first member 22 is raised, the string 12 is curved upwardly as shown at 12A. This curved shape is substantially retained in the molded product.

Figure 8:
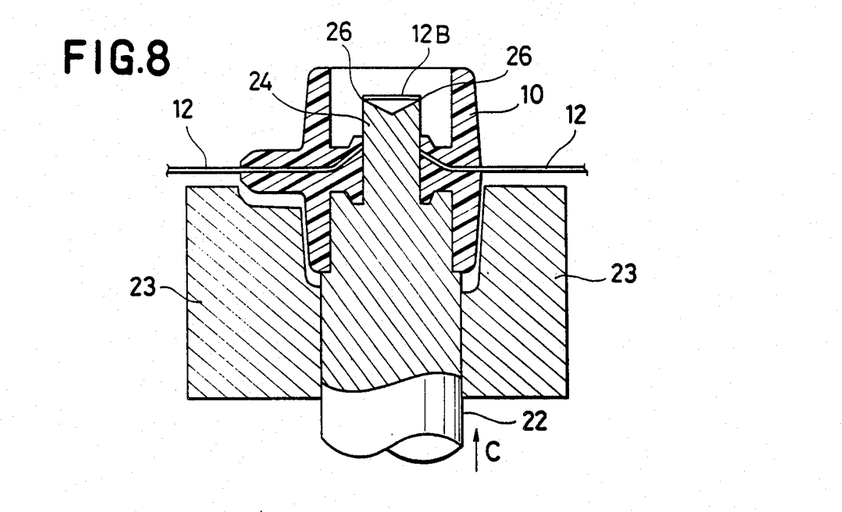
Figure 9:
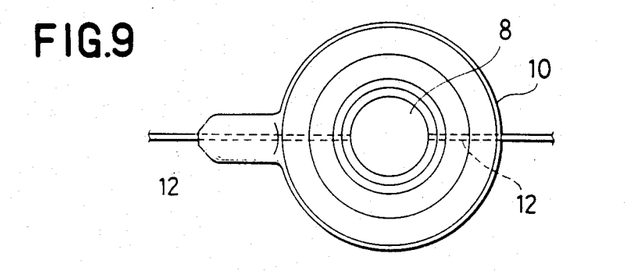
FIG. 9 is an enlarged top plan view of the female member in the fastener of FIG. 4.
Figure 10:
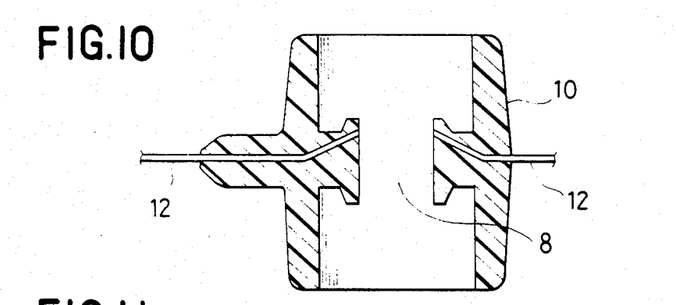
FIG. 10 is a longitudinal sectional view of the female member shown in FIG. 9.

A molten thermoplastic resin is supplied into the cavity 25 through the sprue 18 (FIG. 6). If the resin has solidified, the first member 20 of the upper mold is moved away in the direction of arrows A, and the second member 21 of the upper mold in the direction of arrows B, while the first member 22 of the lower mold is raised further in the direction of the arrow C to remove the molded female member 10 from the second member 23 of the lower mold as shown in FIG. 8. The female member 10 thus obtained and carrying the string 12 is shown in FIGS. 9 and 10.

Figure 11:
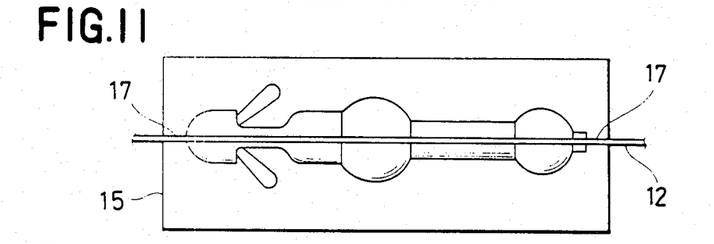
FIG. 11 is a top plan view of the lower half of a mold for forming a male member in the fastener of this invention.
Figure 12:
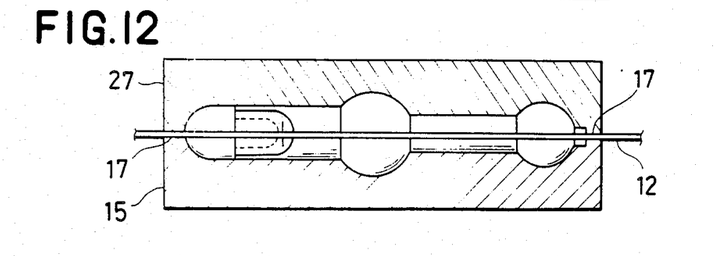
FIG. 12 is a longitudinal sectional view of the upper half of the mold for forming the male member.

A male member 11 is molded as shown in FIGS. 11 and 12, simultaneously with the female member 10. A split mold for forming the male member 11 comprises a lower half 15 which is shown in FIG. 11, and an identically shaped upper half 27 which is shown in FIG. 12, and has a number of string guide passages 17. The string 12 is placed on the longitudinal axis of a cavity defining a male member 11, and the upper mold 27 is placed on the lower mold 15. A molten resin is introduced into the cavity through the sprue 18 (FIG. 6). After solidification of the resin, the mold is opened, and the molded male member 11 is removed from the mold.

After the female and male members 10 and 11 have been molded simultaneously in proximity to each other and removed from the mold, the string 12 is wound on the reel 16 to a predetermined extent as shown in FIG. 6. The molding of a plurality of female and male members 10 and 11 and the winding of the string 12 are repeated alternately as hereinbefore described. If the length of the string 12 wound on the reel 16 is altered, it is possible to obtain a variety of fastener modifications which are different in the length of the string member 12. When a predetermined cycle of the molding operation has been brought to an end, the string 12 is unwound from the reel, and cut between the female member 10 of one fastener and the male member 11 of another.

Figure 13:
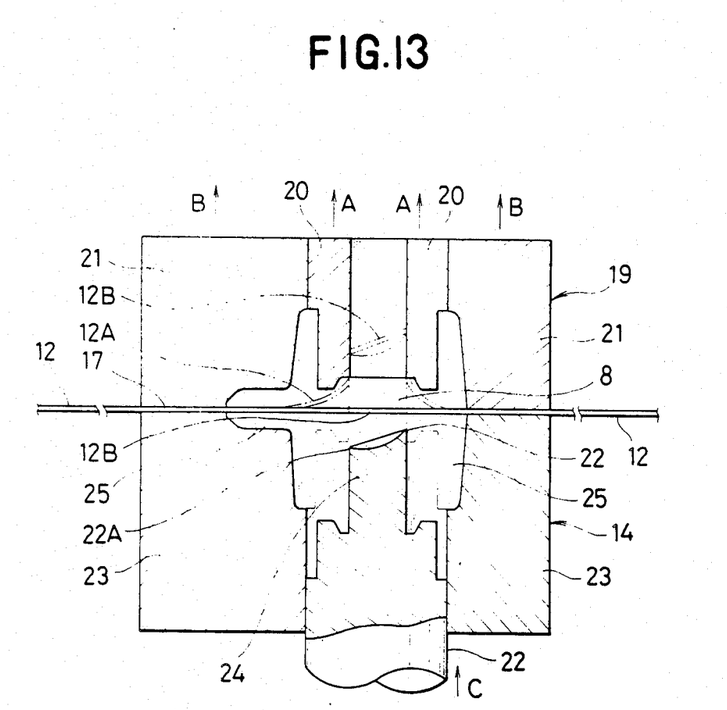
FIG. 13 is a view similar to FIG. 7, but showing a modified lower half for the mold for forming the female member in the fastener of FIG. 4.

FIG. 13 shows a modified first member 22 for the lower mold. Its upright projection 24 has an inclined upper end defining a pair of cutting edges 22 and 22A adapted to cut away the string portion 12B in two successive steps of operation from the opening 5 of a female member 10.

Figure 14:
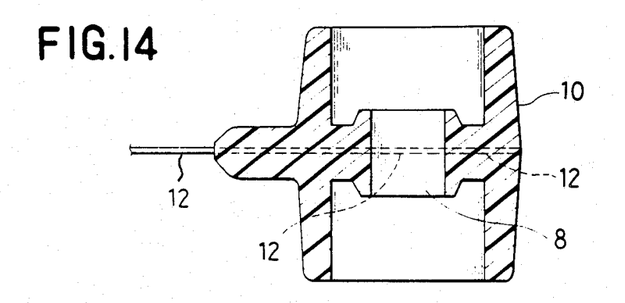
FIG. 14 is a longitudinal sectional view of a female member in a fastener according to a second embodiment of this invention.
Figure 15:
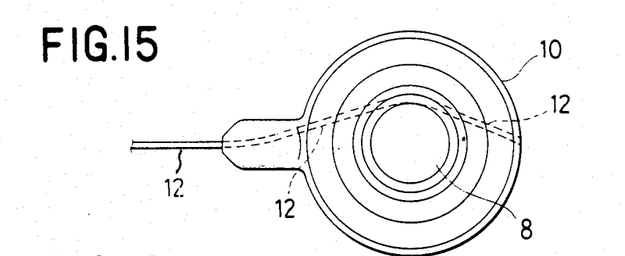
FIG. 15 is a top plan view of the female member shown in FIG. 14.
Figure 16:
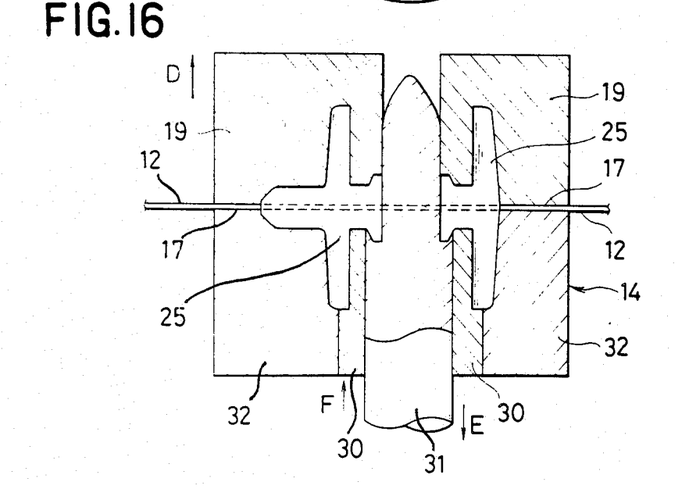
FIG. 16 is a cross sectional view showing the construction of a mold for forming the female member of FIGS. 14 and 15 and the mode of its molding operation.

A fastener according to a second embodiment of this invention is shown in FIGS. 14 and 15. A string 12 lies in a central plane which is perpendicular to the longitudinal axis of a female member 10, and along a path curved about its axial bore 8. This female member is made by a mold which is shown in FIG. 16. The mold comprises an upper half 19 and a lower half 14. The lower half 14 comprises a first member 30, a second member 31 and a third member 32, and has a number of string guide passages 17. The string 12 is positioned along the path curved about the axial bore 8, and the mold is closed. A molten resin is supplied into the cavity 25. Upon solidification of the resin, the upper half 19 of the mold is moved away in the direction of an arrow D, and the second member 31 of the lower mold half 14 in the direction of an arrow E, while the first member 30 is raised in the direction of an arrow F, whereby the molded female member 10 carrying the string 12 is separated from the third member 32 of the lower mold half 14. A male member 11 is molded simultaneously with the female member 10.

Figure 17:
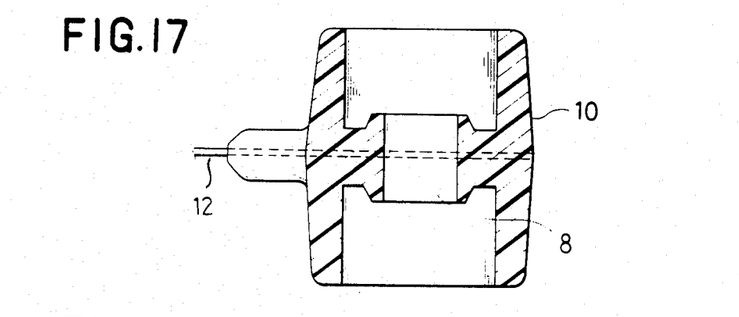
FIG. 17 is a longitudinal sectional view of a female member in a fastener according to a third embodiment of this invention.
Figure 18:
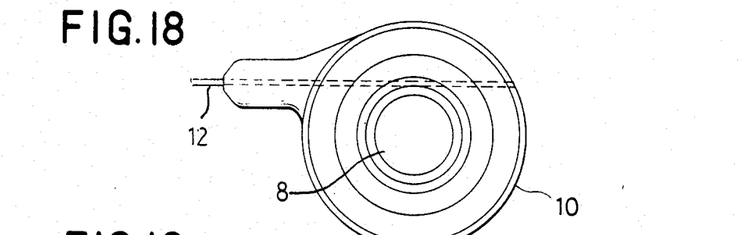
FIG. 18 is a top plan view of the female member shown in FIG. 17.
Figure 19:
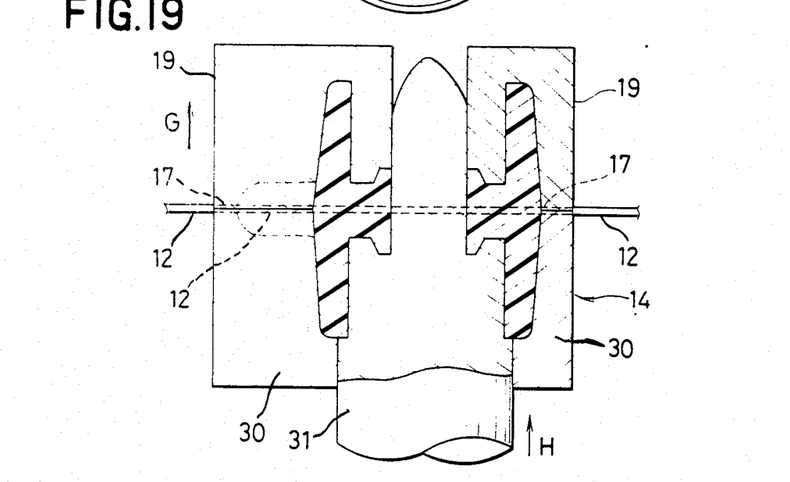
FIG. 19 is a cross sectional view showing the construction of a mold for forming the female member of FIGS. 17 and 18 and the mode of its molding operation.

A fastener according to a third embodiment of this invention is shown in FIGS. 17 and 18. A string 12 lies in a central plane which is perpendicular to the longitudinal axis of a female member 10, and extends tangentially relative to the axial bore 8. This female member is made by a mcld which is shown in FIG. 19. The mold comprises an upper half 19 and a lower half 14. The lower half 14 comprises a first member 35 and a second member 36, and has a string guide passage 17. The string 12 is positioned tangentially relative to the axial bore 8, and the mold is closed. A molten resin is supplied into the mold. Upon solidification of the resin, the upper mold half 19 is moved away in the direction of an arrow G, and the first member 35 of the lower mold half 14 is raised in the direction of an arrow H to separate the molded female member 10 from its second member 36. A male member 11 is molded as hereinbefore described.

In the fastener of this invention, the female and male members 10 and 11 are merely fused to the string member 12 passing therethrough. There is no necessity of stretching the string member 12. It is possible to obtain any desired length for the string member 12, for example, 50 cm or 1 m, depending on the purpose for which the fastener will be used. No such string length has hitherto been obtained in any known fastener having a filament which had to be stretched. Therefore, the fastener of this invention can advantageously be used for any bulky object, such as a down jacket or overcoat. The string member 12 need not be of the same material as the female and male members 10 and 11. It is possible to use, for example, a cotton thread or metal wire for the string member 12. If a gold thread is, for example, used for the string member 12, it is possible to obtain a fastener having a decorative effect.

The method of this invention essentially comprises placing a string 12 in a mold in which cavities for molding a female member 10 and a male member 11 are provided in proximity to each other, molding a female member 10 and a male member 11 simultaneously, removing them from the mold, moving the string forward, repeating the molding of a plurality of female and male members, and cutting the string between the female member 10 of one fastener and the male member 11 of another. This method makes it possible to make a lot of fasteners continuously and achieve a high degree of efficiency in the production of fasteners. The distance for the movement of the string 12 can be selected as desired to facilitate the production of fasteners having any desired length.

The method of this invention also facilitates the production of a fastener assembly carrying a lot of female members 10 and male members 11 alternately on the string 12. This fastener assembly can be set in a fastener attaching apparatus to bind or join articles continuously. In any such fastener assembly, the female and male members are located at predetermined intervals on the string. If the string is cut appropriately between a particular female member and a particular male member, it is possible to position the female and male members at fixed locations and thereby achieve continuously the mechanical operation for engaging a male member in a female member.

I claim:

1. A method of producing a fastener comprising a female member having a longituidinal opening, a male member insertable and lockable into the opening of said female member, and a string member connecting together said female member and said male member with a distance therebetween, wherein the longitudinal axis of said string member is perpendicular to the longitudinal axis of the opening in said female member, said method comprising the steps of:

A. placing a string through a female-member forming mold, said female-member forming mold comprising an upper mold portion and a lower mold portion, said lower mold portion having splittable segments, in such a manner that said string extends across the mold cavity defined btween said upper and lower mold portions when assembled, and then joining said upper mold portion and said lower mold portion together;

B. thereafter raising one of said splittable segments of said lower mold portion to cut said string to provide a through-bore in the opening of the female member to be formed;

C. then, while maintaining said one of said splittable mold segments in the raised position, charging a molten thermoplastic resin into said mold cavity thereby molding the female member of the fastener, and then releasing the formed female member out of the mold by moving the upper mold portion away from the lower mold portion and further raising said raised one of said splittable mold segments of the lower mold portion;

D. placing the string through a male-member forming mold disposed adjacent to said female-member forming mold, the male-member forming mold comprising an upper mold piece and a lower mold piece, the string being disposed so as to extend across the mold cavity defined between said upper and lower mold pieces when assembled; then joining said upper mold piece and said lower mold pieee together, followed by charging molten thermoplastic resin into said mold cavity, thereby forming a male member engageable with the female member formed through the above steps A to C, and thereafter releasing the formed male member by separating said upper mold piece and lower mold piece of said male-member forming mold;

E. thereafter, taking-up a first portion of the string on a roll, then operating a next cycle of molding of the female member and the male member on the string by the above steps A to D, and repeating this operation cycle to produce a length of the string having a number of pairs of the female member and the male member forming in series thereon; and F. thereafter, cutting said length of the string between each adjacent pair of female member and male member.

2. A method as set forth in claim 1, wherein the same molten thermoplastic synthetic resin is supplied into said female and male member forming molds.

3. A method as set forth in claim 1, wherein different molten thermoplastic resins are supplied into said female and male member forming molds, respectively.

4. A method as set forth in claim 1, wherein said resin is selected from the group consisting of polyester and polyamide resins.

5. A method as set forth in claim 1, wherein said string is selected from the group consisting of a stretched thermoplastic resin monofilament, a string of natural fiber, a string of inorganic material and a string of a natural resin.

6. A method as set forth in claim 5, wherein said monofilament is selected from the group consisting of stretched monofilaments of polyester and polyamide resins.

7. A method as set forth in claim 5, wherein said natural fiber is selected from the group consisting of hemp and cotton.

8. A method as set forth in claim 5, wherein said inorganic material is selected from the group consisting of glass fiber, asbestos, iron and steel.

9. A method as set forth in claim 5, wherein said natural resin is selected from the group consisting of rubber and heat resistant resins.

10. A method of making a fastener assembly comprising a plurality of individual fasteners joined together by a string, each of the fasteners comprising a female member having a longitudinal opening, a male member insertable and lockable into the opening of said female member, and a string member formed from a portion of the string and connecting together said male and female members with a distance therebetween, wherein the longitudinal axis of said string member is perpendicular to the longitudinal axis of the opening in said female member, the method comprising the steps of:

A. placing a string through a female-member forming mold, said female-member forming mold comprising an upper mold portion and a lower mold portion, said lower mold portion having splittable segments, in such a manner that said string extends across the mold cavity defined between said upper and lower mold portions when assembled, and then joining said upper mold portion and said lower mold portion together;

B. thereafter raising one of said splittable segments of said lower mold portion to cut said string to provide a through-bore in the opening of the female member to be formed;

C. then, while maintaining said one of said splittable mold segments in the raised position, charging a molten thermoplastic resin into said mold cavity thereby molding the female member of the fastener, and then releasing the formed female member out of the mold by moving the upper mold portion away from the lower mold portion and further raising said raised one of said splittable mold segments of the lower mold portion;

D. placing the string through a male-member forming mold disposed adjacent to said female-member forming mold, the male-member forming mold comprising an upper mold piece and a lower mold piece, the string being disposed so as to extend across the mold cavity defined between said upper and lower mold pieces when assembled; then joining said upper mold piece and said lower mold piece together, followed by charging molten thermoplastic resin into said mold cavity, thereby forming a male member engageable with the female member formed through the above steps A to C, and thereafter releasing the formed male member by separating said upper mold piece and said lower mold piece of said male-member forming mold; and E. thereafter, taking-up a first portion of the string on a roll, then operating a next cycle of molding of the female member and the male member on the string by the above steps A to D, and repeating this operation cycle to produce a length of the string having a number of pairs of the female member and the male member formed in series thereon.

11. A method as set forth in claim 10, wherein the same molten thermoplastic synthetic resin is supplied into said female and male member forming molds.

12. A method as set forth in claim 10, wherein different molten thermoplastic resins are supplied into said female and male member forming molds, respectively.

13. A method as set forth in claim 10, wherein said resin is selected from the group consisting of polyester and polyamide resins.

14. A method as set forth in claim 10, wherein said string is selected from the group consisting of a stretched thermoplastic resin monofilament, a string of natural fiber, a string of inorganic material and a string of a natural resin.

15. A method as set forth in claim 14, wherein said monofilament is selected from the group consisting of stretched monofilaments of polyester and polyamide resins.

16. A method as set forth in claim 14, wherein said natural fiber is selected from the group consisting of hemp and cotton.

17. A method as set forth in claim 14, wherein said inorganic material is selected from the group consisting of glass fiber, asbestos, iron and steel.

18. A method as set forth in claim 14, wherein said natural resin is selected from the group consisting of rubber and heat resistant resins.

19. A method of producing a fastener comprising a female member having a male member longitudinal opening, a male member insertable and lockable into the opening of said female member, and a string member connecting together said female member and said male member with a distance therebetween, wherein the longitudinal axis of said string member is perpendicular to the longitudinal axis of the opening in said female member, said method comprising the steps of:

A. placing a string through a female-member forming mold, said female-member forming mold comprising an upper mold portion and a lower mold portion, said lower mold portion having splittable segments, in such a manner that said string is capable of being moved to extend about the opening of a female member to be formed, and then joining said upper mold portion and said lower mold portion together;

B. thereafter raising one of said splittable segments of said lower mold portion to move said string along an outer peripheral portion thereof;

C. then, while maintaining said one of said splittable mold segments in the raised position, charging a molten thermoplastic resin into said mold cavity thereby molding the female member of the fastener, and then releasing the formed female member out of the mold by moving the upper mold portion away from the lower mold portion and further raising said raised one of said splittable mold segments of the lower mold portion;

D. placing the string through a male-member forming mold disposed adjacent to said female-member forming mold, the male-member forming mold comprising an upper mold piece and a lower mold piece, the string being disposed so as to extend across the mold cavity defined between said upper and lower mold pieces when assembled; then joining said upper mold piece and said lower mold piece together, followed by charging molten thermoplastic resin into said mold cavity, thereby forming a male member engageable with the female member formed through the above steps A to C, and thereafter releasing the formed male member by separating said upper mold piece and said lower mold piece of said male-member forming mold;

E. thereafter, taking-up a first portion of the string on a roll, then operating a next cycle of molding of the female member and the male member on the string by the above steps A to D, and repeating this operation cycle to produce a length of the string having a number of pairs of the female member and the male member formed in series thereon; and F. thereafter, cutting said length of the string between each adjacent pair of female member and male member.

20. A method as set forth in claim 19, wherein the same molten thermoplastic synthetic resin is supplied into said female- and male-member forming molds.

21. A method as set forth in claim 19, wherein different molten thermoplastic resins are supplied into said female-member, and said male-member, forming molds, respectively.

22. A method as set forth in claim 19, wherein said resin is selected from the group consisting of polyester and polyamide resins.

23. A method as set forth in claim 19, wherein said string is selected from the group consisting of a stretched thermoplastic resin monofilament, a string of a natural fiber, a string of an inorganic material and a string of natural resin.

24. A method as set forth in claim 23, wherein said monofilament is selected from the group consisting of stretched monofilaments of polyester and polyamide resins.

25. A method as set forth in claim 23, wherein said natural fiber is selected from the group consisting of hemp and cotton.

26. A method as set forth in claim 23, wherein said inorganic material is selected from the group consisting of glass fiber, asbestos, iron and steel.

27. A method as set forth in claim 23, wherein said natural resin is selected from the group consisting of rubber and heat resistant resins.

28. A method of making a fastener assembly comprising a plurality of individual fasteners joined together by a string, each of the fasteners comprising a female member having a longitudinal opening, a male member insertable and lockable into the opening of said female menber, and a string member formed from a portion of the string and connecting together said male and female members with a distance therebetween, wherein the longitudinal axis of said string member is perpendicular to the longitudinal axis o the opening in said female member, the method comprising the steps of:

A. placing a string through a female-member forming mold, said female-member forming mold comprising an upper mold portion and a lower mold portion, said lower mold portion having splittable segments, in such a manner that said string is capable of being moved to extend about the opening of a female member to be formed, and then joining said upper mold portion and said lower mold portion together;

B. thereafter raising one of said splittable segments of said lower mold portion to move said string along an outer peripheral portion thereof;

C. then, while maintaining said one of said splittable mold segments in the raised position, charging a molten thermoplastic resin into said mold cavity thereby molding the female member of the fastener, and then releasing the formed female member out of the mold by moving the upper mold portion away from the lower mold portion and further raising said raised one of said splittable mold segments of the lower mold portion;

D. placing the string through a male-member forming mold disposed adjacent to said female-member forming mold, the male-member forming mold comprising an upper mold piece and a lower mold piece, the string being disposed so as to extend across the mold cavity defined between said upper and lower mold pieces when assembled; then joining said upper mold piece and said lower mold piece together, followed by charging molten thermoplastic resin into said mold cavity, thereby forming a male member engageable with the female member formed through the above steps A to C, and thereafter releasing the formed male member by separating said upper mold piece and said lower mold piece of said male-member forming mold; and E. thereafter, taking-up a first portion of the string on a roll, then operating a next cycle of molding of the female member and the male member on the string by the above steps A to D, and repeating this operation cycle to produce a length of the string having a number of pairs of the female member and the male member formed in series thereon.

29. A method as set forth in claim 28, wherein the same molten thermoplastic synthetic resin is supplied into said female- and male-member forming molds.

30. A method as set forth in claim 28, wherein different molten thermoplastic resins are supplied into said female- and male-member forming molds, respectively.

31. A method as set forth in claim 28, wherein said resin is selected from the group consisting of polyester and polyamide resins.

32. A method as set forth in claim 28, wherein the string is selected from the group consisting of a stretched thermoplastic resin monofilament, a string of natural fiber, a string of inorganic material and a string of a natural resin.

33. A method as set forth in claim 32, wherein said monofilament is selected from the group consisting of stretched monofilaments of polyester and polyamide resins.

34. A method as set forth in claim 32, wherein said natural fiber is selected from the group consisting of hemp and cotton.

35. A method as set forth in claim 32, wherein said inorganic material is selected from the group consisting of glass fiber, asbestos, iron and steel.

36. A method as set forth in claim 32, wherein said natural resin is selected from the group consisting of rubber and heat resistant resins.

37. A method of producing a fastener comprising a female member having a longitudinal opening, a male member insertable and lockable into the opening of said female member, and a string member connecting together said female member and said male member with a distance therebetween, wherein the longitudinal axis of said string member is perpendicular to the longitudinal axis of the opening in said female member, said method comprising the steps of:

A. placing a string through a female-member forming mold, said female-member forming mold comprising an upper mold portion and a lower mold portion, said lower mold portion having splittable segments, in such a manner that said string extends linearly along a line substantially tangential to the opening of the female member to be formed, and then joining said upper mold portion and lower mold portion together;

B. thereafter raising one of said splittable segments of said lower mold portion;

C. then, while maintaining said one of said splittable mold segments in the raised position, charging a molten thermoplastic resin into said mold cavity thereby molding the female member of the fastener, and then releasing the formed female member out of the mold by moving the upper mold portion away from the lower mold portion and further raising said raised one of said splittable mold segments of the lower mold portion;

D. placing the string through a male-member forming mold disposed adjacent to said female-member forming mold, the male-member forming mold comprising an upper mold piece and a lower mold piece, the string being disposed so as to extend across the mold cavity defined between said upper and lower mold pieces when assembled; then joining said upper mold piece and said lower mold piece together, followed by charging molten thermoplastic resin into said mold cavity, thereby forming a male member engageable with the female member formed through the above steps A to C, and thereafter releasing the formed male member by separating said upper mold piece and said lower mold piece of said male-member forming mold;

E. thereafter, taking-up a first portion of the string on a roll, then operating a next cycle of molding of the female member and the male member on the string by the above steps A to D, and repeating this operation cycle to produce a length of the string having a number of pairs of the female member and the male member formed in series thereon; and F. thereafter, cutting said length of the string between each adjacent pair of female member and male member.

38. A method as set forth in claim 37, wherein the same molten thermoplastic synthetic resin is supplied into said female- and male-member forming molds.

39. A method as set forth in claim 37, wherein different molten thermoplastic resins are supplied into said female- and male-member forming molds, respectively.

40. A method as set forth in claim 37, wherein said resin is selected from the group consisting of polyester and polyamide resins.

41. A method as set forth in claim 37, wherein said string is selected from the group consisting of stretched thermoplastic resin monofilament, a string of natural fiber, a string of inorganic material and string of a natural resin.

42. A method as set forth in claim 41, wherein said monofilament is selected from the group consisting of stretched monofilaments of polyester and polyamide resins.

43. A method as set forth in claim 41, wherein said natural fiber is selected from the group consisting of hemp and cotton.

44. A method as set forth in claim 41, wherein said inorganic material is selected from the group consisting of glass fiber, asbestos, iron and steel.

45. A method as set froth in claim 41, wherein said natural resin is selected from the group consisting of rubber and heat resistant resins.

46. A method of making a fastener assembly comprising a plurality of individual fasteners joined together by a string, each of the fasteners comprising a female member having a longitudinal opening, a male member insertable and lockable into the opening of said female member, and a string member formed from a portion of the string and connecting together said male and female members with a distance therebetween, wherein the longitudinal axis of said string member is perpendicular to the longitudinal axis of the opening in said female member, the method comprising the steps of:

A. placing a string through a female-member forming mold, said female-member forming mold comprising an upper mold portion and a lower mold portion, said lower mold portion having splittable segments, in such a manner that said string extends linearly along a line substantially tangential to the opening of the female member to be formed, and then joining said upper mold portion and lower mold portion together;

B. thereafter raising one of said splittable segments of said lower mold portion;

C. then, while maintaining said one of said splittable mold segments in the raised position, charging a molten thermoplastic resin into said mold cavity thereby molding the female member of the fastener, and then releasing the formed female member out of the mold by moving the upper mold portion away from the lower mold portion and further raising said raised one of said splittable mold segments of the lower mold portion;

D. placing the string through a male-member forming mold disposed adjacent to said female-member forming mold, the male-member forming mold comprising an upper mold piece and a lower mold piece, the string being disposed so as to extend across the mold cavity defined between said upper and lower mold pieces when assembled; then joining said upper mold piece and said lower mold piece together, followed by charging molten thermoplastic resin into said mold cavity, thereby forming a male member engageable with the female member formed through the above steps A to C, and thereafter releasing the formed male member by separating said upper mold piece and said lower mold piece of said male-member forming mold; and E. thereafter, taking-up a first portion of the string on a roll, then operating a next cycle of molding of the female member and the male member on the string by the above steps A to D, and repeating this operation cycle to produce a length of the string having a number of pairs of the female member and the male member formed in series thereon.

47. A method as set forth in claim 46, wherein the same molten thermoplastic synthetic resin is supplied into said female- and male-member forming molds.

48. A method as set forth in claim 46, wherein different molten thermoplastic resins are supplied into said female- and male-member forming molds, respectively.

49. A method as set forth in claim 46, wherein said resin is selected from the group consisting of polyester and polyamide resins.

50. A method as set forth in claim 46, wherein said string is selected from the group consisting of a stretched thermoplastic resin monofilament, a string of natural fiber, a string of inorganic material and a string of a natural resin.

51. A method as set forth in claim 50, wherein said monofilament is selected from the group consisting of stretched monofilaments of polyester and polyamide resins.

52. A method as set forth in claim 50, wherein said natural fiber is selected from the group consisting of hemp and cotton.

53. A method as set forth in claim 50, wherein said inorganic material is selected from the group consisting of glass fiber, asbestos, iron and steel.

54. A method as set forth in claim 50, wherein said natural resin is selected from the group consisting of rubber and heat resistant resins.

* * * * *